F. E. SAINT CLAIR.
HAND STEERING WHEEL.
APPLICATION FILED JAN. 23, 1917.

1,262,392.

Patented Apr. 9, 1918.

WITNESSES

INVENTOR
F. E. Saint Clair,
BY Victor J. Evans
ATTORNEY

UNITED STATES PATENT OFFICE.

FRANK E. SAINT CLAIR, OF WORLAND, WYOMING.

HAND STEERING-WHEEL.

1,262,392.　　　　Specification of Letters Patent.　　Patented Apr. 9, 1918.

Application filed January 23, 1917. Serial No. 143,980.

*To all whom it may concern:*

Be it known that I, FRANK E. SAINT CLAIR, a citizen of the United States, residing at Worland, in the county of Washakie and State of Wyoming, have invented new and useful Improvements in Hand Steering-Wheels, of which the following is a specification.

This invention relates to hand steering wheels the object in view being to provide a wheel of the class referred to, embodying a construction or formation whereby water may be circulated through the wheel for the purpose of regulating the temperature of said wheel in accordance with the desire and comfort of the operator of the vehicle in connection with which the wheel is used.

A further object of the invention is to provide means whereby the wheel may be adapted to machines of different makes, thereby enabling the wheel to be manufactured and placed on the market as a stock article so that it may be applied to vehicles already in use or easily altered for use in connection with the product of any manufacturer desiring to adopt the same.

With the above and other objects in view, the invention consists in the novel construction, combination and arrangement of parts, herein described, illustrated and claimed.

Figure 1:
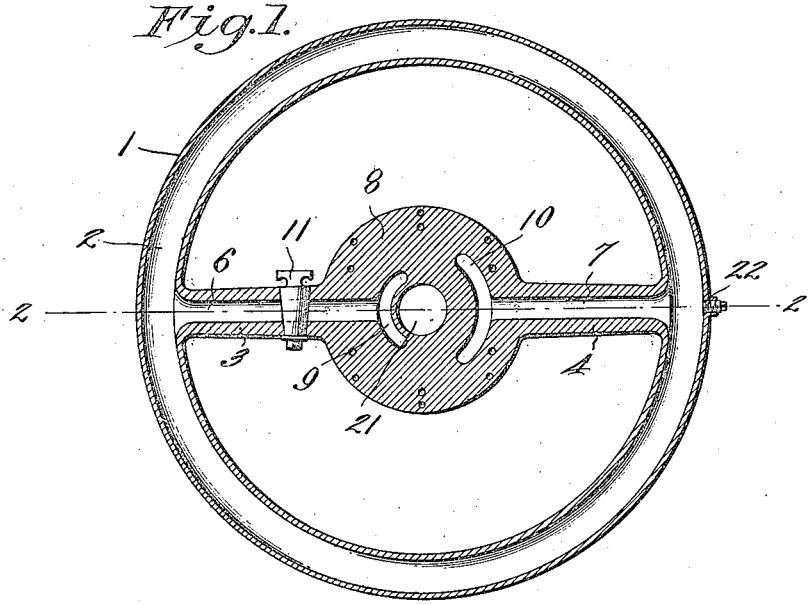

In the accompanying drawings:

Figure 1 is a section through the improved hand steering wheel, taken at right angles to the axis of movement of said wheel.

Figure 2:
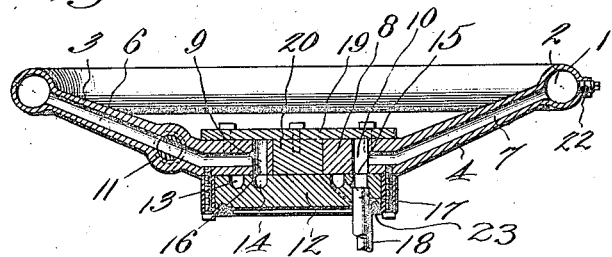

Fig. 2 is a diametrical section on the line 2—2 of Fig. 1.

Figure 3:
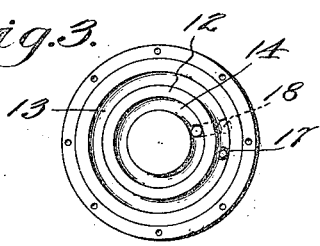

Fig. 3 is a top plan view of the stationary channeled member of the device.

The wheel contemplated in this invention is of tubular formation, comprising a rim or annular hand grip 1 of tubular construction so as to provide an annular water circulation space 2. Diametrically opposite spokes 3 and 4 of said wheel are also of tubular construction so as to provide water passages 6 and 7 which communicate directly with the annular water space 2 and which lead into the hub 8 where the passage 6 is expanded to form an arcuate portion 9 concentric with the axis of the wheel, the other passage 7 being also expanded at its inner end to form an arcuate portion 10 which is also concentric with the axis of the wheel but located at a slightly greater distance from the center of the wheel than the arcuate portion 9 above referred to. A flow regulating valve or cock 11 is associated with the spoke 3 so that if desired, the flow of water through the wheel may be cut off or regulated in accordance with the desire of the operator.

In conjunction with the hub of the wheel, a stationary bearing plate 12 is employed and the same is mounted in fixed relation to the uppper extremity of the steering column or tubular outer casing through which the steering shaft and other controls pass. The plate 12 is formed in the upper side thereof with annular grooves 13 and 14 concentric with the center of the wheel, the annular channel or groove 13 being in communication with a port 15 in the hub of the wheel, and the channel or groove 14 being in communication with a similar port 16 in the hub 8. Communicating with the channel 13 is a water pipe 17, another water pipe 18 communicating with the channel 14, thus enabling water to be led to and from the wheel. The arcuate portions 9 and 10 of the water passages in the wheel, allow for the turning movement of said wheel without cutting off the flow of water through the water spaces of the wheel.

19 designates a disk shaped plate or closure for the upper face of the hub 8. Said plate or closure is formed with a central cylindrical boss 20 which fits into a correspondingly shaped recess 21 in the center of the hub 8. The plate or closure 19 is tightly fastened to the hub 8 by screws or fasteners of any desired or preferred type. The hand steering wheel usually sits at an angle and in order to drain water therefrom, a drain plug 22 is threaded into an opening in the lowest portion thereof as shown in Fig. 2. The pipes 17 and 18 may connect with the hot water circulatory system of a motor vehicle at any convenient point so that hot water may be led through the rim or annular hand grip of the steering wheel and by means of the regulating valve or cock 11, a greater or less amount of water may be allowed to circulate through the wheel in accordance with the temperature desired by the operator. The device will be found a valuable and comfortable adjunct especially in the winter season, keeping the hands of the operator warm and even enabling him to dispense with the use of gloves and thereby have better control at all times over the vehicle.

As shown in Fig. 1 the wheel comprises only two spokes arranged in the same diametrical line and these spokes are usually arranged in line with the longitudinal axis of the machine, when the steering wheels are in a straight away position. This adds to the comfort of the operator in steering the machine. The member 12 may be provided with a groove to receive a packing ring 23 to prevent leakage when wear takes place between the meeting faces of the members 8 and 12.

I claim:—

A hand steering wheel comprising a rim of tubular formation forming an inclosed annular water passage, diametrically opposite spokes also of tubular formation providing other water passages communicating with the first named passage of said rim, a hub having arcuate concentric slots in communication with the passages of the tubular spokes and arranged at different distances from the center of the wheel, a stationary supporting plate for the wheel hub having annular channels in the upper face thereof, water pipes leading to and from said annular channels, the latter being in communication with the passages in said spokes, and a cover plate fastened to the top of said hub and sealing said slots.

In testimony whereof I affix my signature.

FRANK E. SAINT CLAIR.